United States Patent [19]

Possell

[11] 4,232,992
[45] Nov. 11, 1980

[54] GEOTHERMAL TURBINE AND METHOD OF USING THE SAME

[76] Inventor: Clarence R. Possell, 4842 Viane Way, San Diego, Calif. 92110

[21] Appl. No.: 953,650

[22] Filed: Oct. 23, 1978

[51] Int. Cl.³ .................... F01D 1/36; F01D 17/14; F03G 7/04
[52] U.S. Cl. ...................... 415/90; 415/164; 60/641
[58] Field of Search ............... 415/90, 164, 165, 167; 60/641

[56] References Cited

U.S. PATENT DOCUMENTS

| | | | |
|---|---|---|---|
| 149,802 | 4/1874 | Smith et al. | 415/165 |
| 156,102 | 10/1874 | Rodgers | 415/165 |
| 1,013,248 | 1/1912 | Wilkinson | 415/90 |
| 1,047,898 | 12/1912 | Scott | 415/90 |
| 1,056,338 | 3/1913 | Johnsen | 415/90 |
| 1,197,761 | 9/1916 | Pfau | 415/164 |
| 1,323,542 | 12/1919 | Naylor | 415/165 |
| 2,640,678 | 6/1953 | Andresen | 415/90 |
| 3,157,793 | 11/1964 | Adkins | 415/90 |
| 3,326,522 | 6/1967 | Pickering | 415/167 X |
| 4,077,220 | 3/1978 | Matthews | 60/641 |

*Primary Examiner*—Leonard E. Smith
*Attorney, Agent, or Firm*—William C. Babcock

[57] ABSTRACT

A turbine and method of using the same to generate rotational power from a desired geothermal source from which a multi-phase pressurized and heated fluid is discharged, which fluid contains steam and particles of water, and may contain particles of solid material. The turbine includes a rotor plate with a number of spaced discs secured to opposite sides thereof that are rotatably supported in a housing, and the housing having two laterally spaced sets of circumferentially disposed nozzle bodies situated therein that are each adjustable to define a convergent section, a throat and a diverging section. The nozzle bodies are so adjustable that streams of fluid at maximum velocity for a multi-phase fluid having particular characteristics as to heat, pressure and water droplet content discharge tangentially onto the two sets of spaced discs to flow through the spaces therebetween in spiral paths to discharge through openings in the centers thereof. The fluid as it pursues a spiral path exerts a drag on the discs, with the fluid losing kinetic energy that is transferred to the discs, rotor plate and shaft to drive them as an integral unit. No substantial lateral force is exerted on seals in the turbine as the lateral force generated by one set of discs by pressurized fluid flowing through the spaces therebetween is cancelled out by a like and opposite force generated on the other set of discs by the fluid.

11 Claims, 5 Drawing Figures

GEOTHERMAL TURBINE AND METHOD OF USING THE SAME

CROSS-REFERENCE TO RELATED APPLICATIONS

The present invention is a modification of my "Power Producing Constant Speed Turbine" disclosed and claimed in application Ser. No. 845,441 now U.S. Pat. No. 4,186,554 filed in the United States Patent Office on Oct. 25, 1977 which is a continuation of application Ser. No. 630,430 of the same title filed in the United States Patent Office Nov. 10, 1975, which last-mentioned application has been abandoned in favor of the above-identified continuation application.

BACKGROUND OF THE INVENTION

Field of the Invention

Geothermal Turbine and Method of Using the Same.

Description of the Prior Art

Prior to the present invention the use of geothermal energy has been limited to those areas that produce dry super heated steam. Such areas are extremely limited in number. In geothermal areas where dry super heated steam is available conventional turbines may be used to produce power.

In most geothermal areas the hot pressurized fluid produced from bore holes is of the multiphase type, that is, the fluid is a mixture of steam, droplets of entrained water, and also finely particled solid materials. If such hot pressurized fluid is to be used for power producing purposes with a conventional turbine the entrained droplets of water and particles of solid materials must first be removed therefrom. Removal of the droplets of water results in the loss of their heat energy as well as the kinetic energy they possess. Furthermore, the removal of the droplets of water results in loss of heat on the pressurized fluid. The use of a mixture of steam and entrained droplets of water for power producing purposes with conventional turbines results in the blades of the latter being eroded in a relatively short time.

From the above comments it will be apparent that the greatest amount of power could be produced if the entire effluent could be used for not only does the steam possess kinetic energy but this is equally true of the entrained droplets of water. In attempting to use hot pressurized of a multiphase nature a major problem is to select a turbine nozzle that may be used effectively on the widely varying effluents one encounters not only in different geothermal areas, but from different wells in the same area.

A major object of the present invention is to provide a turbine in which first and second spaced discs on opposite sides of a circular rotor are concurrently subjected to jets of heated pressurized geothermal fluid from a number of circumferentially spaced overlapping nozzles that not only cooperate with a housing to define a circular ring-shaped space into which the effluent is discharged, but with the nozzles being of such structure as to be adjustable as to the relative dimensions of the convergent sections, the throats and the divergent sections thereof to obtain jets of pressurized fluid that are at maximum velocity when they are directed tangentially into the spaces between the discs.

Another object of the invention is to supply a turbine that has a minimum lateral force exerted on the rotor plate and first and second sets of discs due to the fluid exerting equal and opposite forces on the first and second sets of discs prior to flowing through openings in the center thereof to be returned to a bore hole that extends to the geothermal zone.

Another object of the invention is to furnish a geothermal turbine that is quiet in operation, and one that is not damaged by entrained liquid and solid particles in the effluent, for due to the boundary layer of effluent on adjoining surfaces of the discs, the liquid and solid particles do not come into contact with these surfaces as the effluent loses kinetic energy in flowing between the discs in spiral paths.

SUMMARY OF THE INVENTION

The present invention is a geothermal turbine assembly that may be adjusted to produce maximum rotational power from a particular geothermal source of a multiphase fluid that includes steam and droplets of water and in addition may contain particles of solid material. The turbine assembly includes a shaft that has first and second end portions and an intermediate portion therebetween. A circular rotor plate is mounted on the first end portion of the shaft. First and second sets of spaced discs are situated on opposite sides of the plate and secured thereto with the spacing between each two of the discs in a set being greater than the maximum dimensions of one of the solid particles that may be discharged through the turbine.

The discs in the first and second sets have axially aligned centered openings.

The turbine includes a housing assembly that includes first and second laterally spaced side pieces and an end piece that extends therebetween, and cooperates with the side pieces to define a confined space in which the plate and first and second discs are disposed. A circular rib projects inwardly from the end piece to a position closely adjacent the periphery of the rotor plate. the rib, first and second side pieces, and the end piece cooperate to define first and second ring shaped spaces on the outer portion of the confined space.

The pressurized effluent is discharged concurrently into the first and second ring shaped spaces. First and second sets of elongate nozzle bodies are pivotally supported in overlapping relationship from opposite sides of the rib and inwardly from the end piece, with each pair of the nozzle bodies cooperating to define a converging space, a throat, and a diverging space therebetween. The diverging spaces in the first and second sets of nozzle bodies are in communication with the first and second ring-shaped spaces and are substantially tangentially disposed relative to the outer peripheries of the first and second sets of discs. Adjustable means are provided for holding each pair of nozzles in fixed positions relative to one another to permit the pressurized and heated fluids to discharge from the diverging sections between a pair of nozzle bodies at a maximum velocity for a geothermal effluent having a particular pressure, temperature and water droplet content.

First and second discharge openings are defined on opposite sides of the housing that are in communication with centered openings in the first and second sets of discs. Fluid discharges through the first and second discharge openings after traversing spiral paths through the spaces between the discs. Seals are provided in the turbine to prevent the pressurized fluid in the confined space discharging from the first and second discharg openings without first flowing through the spaces between the first and second sets of discs to impart kinetic energy thereto. The pressurized fluid as it flows through the spaces between the discs pursues spiral paths as it loses velocity and pressure and the loss of kinetic energy being imparted to the discs to drive the shaft, rotor plate, and first and second discs as an integral unit.

The shaft is rotatably supported by bearing means disposed exteriorly of the housing, with the shaft having a power take-off on a portion thereof adjacent the second end thereof.

Due to the incoming pressurized effluent being divided into first and second streams that flow concurrently through the first and second discs and discharge on opposite sides of the housing, the circular rotor plate is subjected to equal and opposite laterally directed forces, and no substantial longitudinal force is exerted on the shaft.

Accordingly, thrust bearings are not required in rotatably supporting the shaft.

DESCRIPTION OF THE PREFERRED EMBODIMENT

Figure 1:
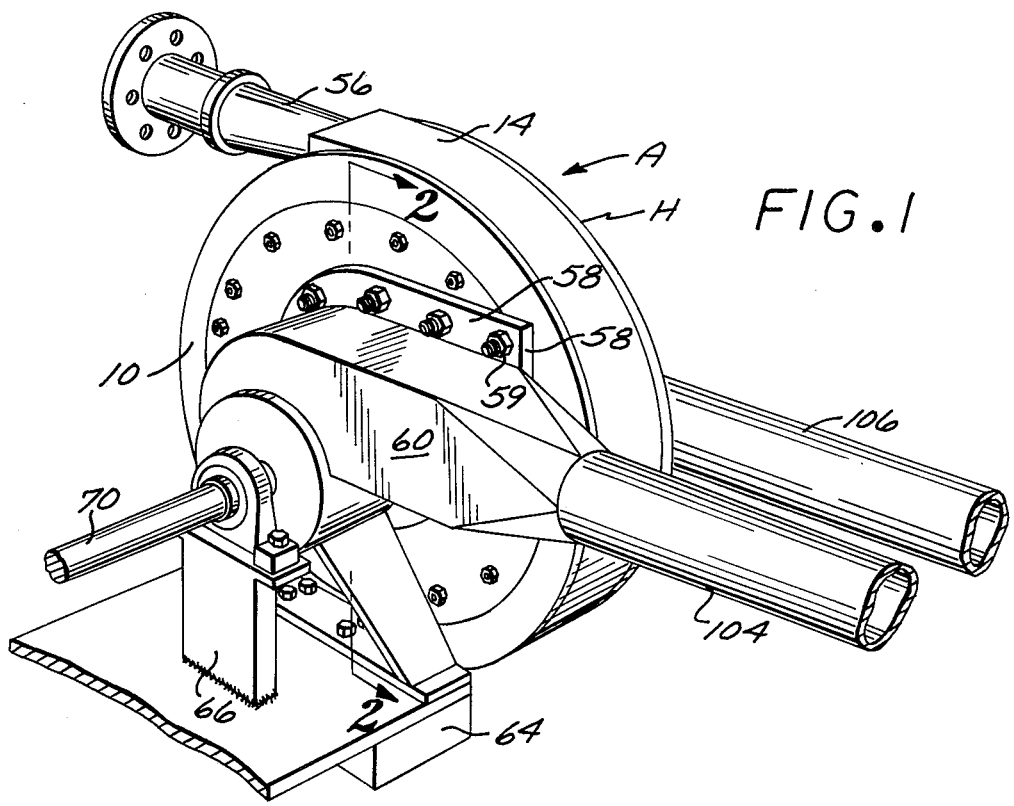
FIG. 1 is a perspective view of the geothermal turbine.
Figure 5:
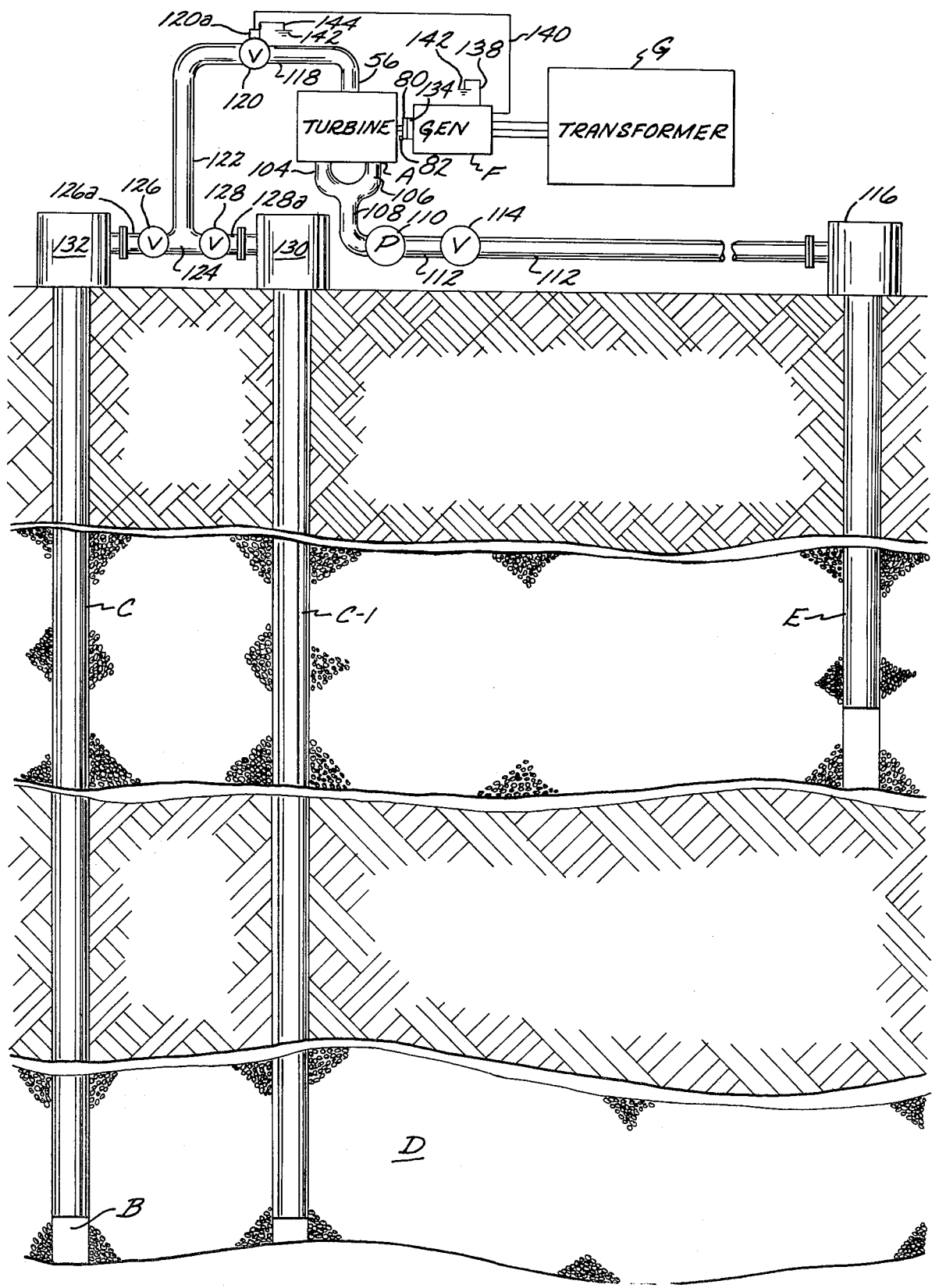
FIG. 5 is a diagrammatic view of the geothermal turbine in use in producing power from a geothermal source where the effluent is of a multiphase nature and contains steam, droplets of water, and in some instances particles of entrained solids.

The geothermal turbine A as shown in FIG. 1 is illustrated in FIG. 5 as being powered by heated and pressurized multiphase effluent B that discharges from either a first bore hole C or second bore hole C-1, which bore holes are in communication with a geothermal formation D. A third bore hole E is provided into which geothermal effluent is discharged after flowing through the turbine A to again be returned to the geothermal formation D. The turbine A as can be seen in FIG. 5 is utilized in driving an electric generator F, with power generated in this manner flowing to a transformer G.

Figure 2:
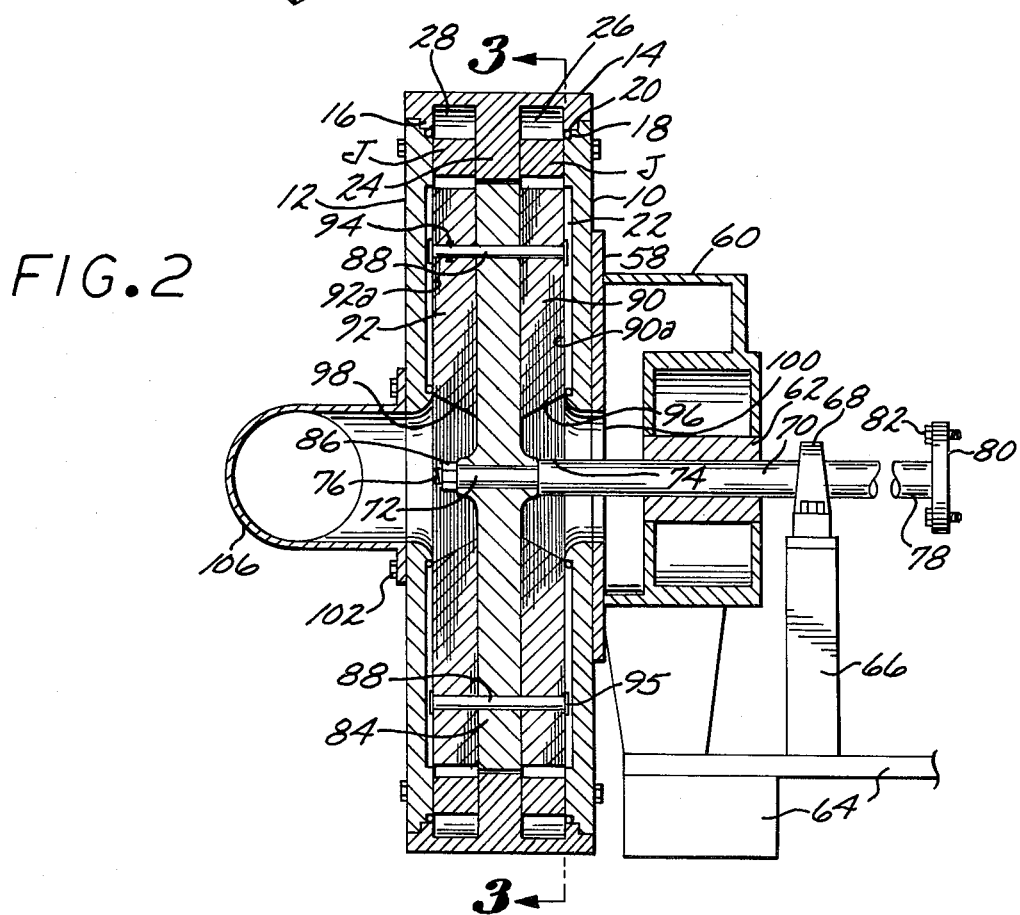
FIG. 2 is a vertical cross sectional view of the geothermal turbine taken on the line 2—2 of FIG. 1.

Geothermal turbine A is illustrated in FIG. 1 as including a housing H that has a first circular side piece 10 and second circular side piece 12, and a circular end piece 14 that extends therebetween. The circular end piece 14 as shown in FIG. 2 includes a pair of laterally spaced inwardly extending tongues 16 that engage circular recesses 18 formed in the first and second end pieces 10 and 12. A pair of circular sealing rings 20 are disposed in the recesses 18 and are in pressure sealing contact with the tongues 16. The first and second side peices 10 and 12 cooperate with the end piece 14 to define a confined space 22.

A centrally disposed rib 24 extends inwardly from the end piece 14 and subdivides the confined space 22 on the outer peripheral portion thereof into first and second ring-shaped spaces 26 and 28. Each of the first and second ring-shaped spaces 26 and 28 has a number of elongate nozzle bodies J disposed therein in overlapping relationship with each nozzle body preferably being formed from a plate of steel or other rigid material.

Figure 4:
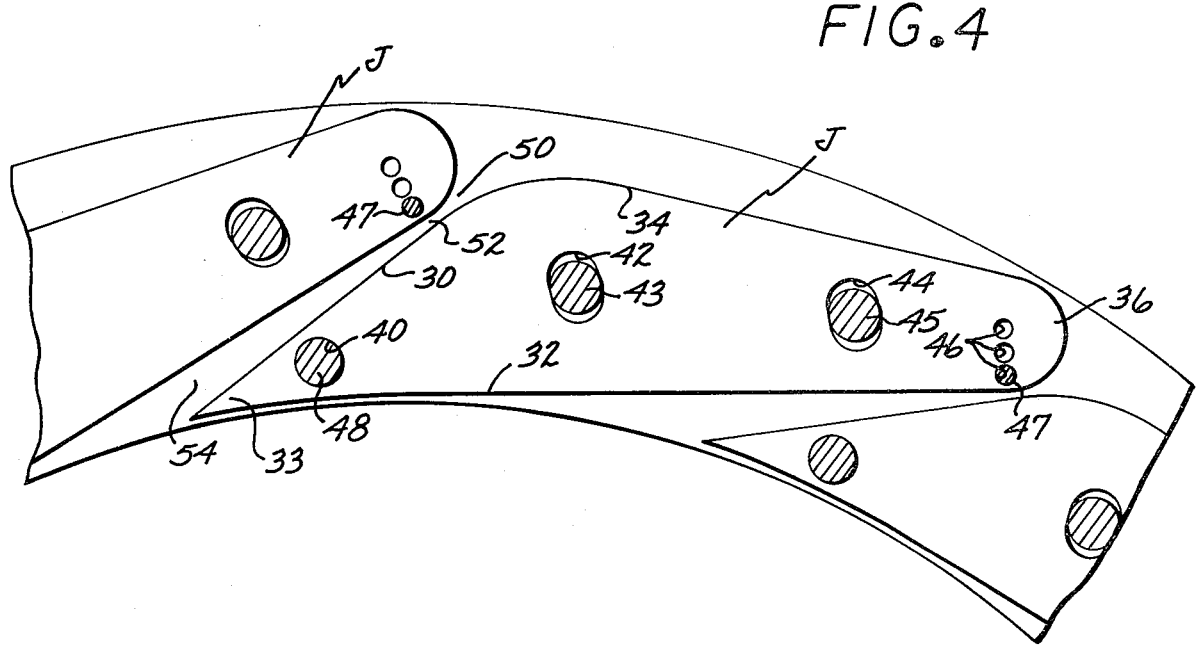
FIG. 4 is a fragmentary enlarged side elevational view of the adjustable nozzle bodies.

Each of the nozzle bodies J includes a forward edge surface 30, bottom edge surface 32, top edge surface 34, rearward edge surface 36, and the forward and bottom edge surfaces merging to define an apex 33 as may best be seen in FIG. 4. The bottom edge surface 32 adjacent the apex 33 as may be seen in FIG. 4 is slightly concave.

Each of the nozzle bodies J adjacent the apex 33 thereof has a transverse bore 40 formed therein, and the nozzle body also having longitudinally spaced first and second transverse slots 42 and 44 therein. A number of pins 48 extend transversely between the rib 24 and the side pieces 10 and 12, with the pins 48 serving to pivotally support the nozzle bodies J.

Each of the nozzle bodies J has a first and second slot 42 and 44 therein engaged by first and second elongate members 43 and 45 that extend between the rib 24 and the side pieces 10 and 12. The first and second members 43 and 45 are preferably of transverse circular cross section. The length of the first and second slots 42 and 44 limits the degree to which each of the nozzle bodies J may be pivoted on the pin 48 associated therewith.

Each of the nozzle bodies J adjacent the rearward edge surface 36 has a number of spaced apertures 46 therein, any one of which may be aligned with a pair of transverse openings in the rib 24 and side piece 10 or 12, and so aligned be engaged by a dowel pin 47 that serves to hold the nozzle body in a desired adjusted angular position between the rib 24 and first or second side piece 10 or 12, and in one of the ring-shaped spaces 26 or 28. In FIG. 4 it will be seen that each pair of nozzle bodies J cooperate to define a converging space 50, throat 52, and diverging space 54 therebetween.

In FIGS. 1 and 5 it will be seen that the turbine A includes a multiphase fluid inlet 56 that is in communication on the forward end thereof with the first and second ring-shaped spaces 26 and 28, and the fluids discharged into these ring-shaped spaces flows therefrom through the converging spaces 50, throat 52, and diverging spaces 54.

The first side piece 10 as best seen in FIGS. 1 and 2 has a plate 58 secured thereto by bolts 59 or other fastening means, with the plate supporting an outwardly extending hollow shell 60, which shell has a first bearing structure 62 centrally disposed therein.

The turbine A includes a base 64 as best seen in FIGS. 1 and 2 that has an upright 56 supported thereon, with the upright on the upper extremity thereof supporting a second bearing structure that is aligned with the first bearing structure 62. A transversely extending substantially horizontal shaft 70 is rotatably supported in the first and second bearing structure 62 and 68 as shown in FIG. 2, with the shaft including a first end portion 72 of reduced diameter that forms a body shoulder 74 at a junction with the shaft 70. The shaft 70 includes a second end 78 best seen in FIG. 2 that supports a flange 80 through which bolts 82 extend to provide a power take-off.

A heavy circular rotor plate 84 of substantial thickness and formed from a rigid material such as steel or the like is provided, which rotor plate 84 as may be seen in FIG. 2 has a central thickened hub portion that is mounted on the first end portion 72 of shaft 70 in abutting contact with body shoulder 74, and a nut 86 being provided that threadedly engages threads 76 on the end portion 72. The rotor plate 84 is gripped between the body shoulder 74 and nut 86 and is held in a nonrotatable position relative to the shaft 70. The rotor plate 84 is of such diameter that the outer circumferential surface thereof is closely disposed to the interior surface of the rib 24 as may be seen in FIG. 2. The rotor plate 84 supports a number of circumferentially spaced transverse pins 88 that extend outwardly from opposite sides of the rotor plate and the pins serving as mountings for a first and second set of spaced discs 90 and 92, with the discs in each set being separated by transverse spaces 90a and 92a. The pins 88 have a number of space washers 94 mounted thereon with each of the washers being in abutting contact with two of the discs, to define one of the spaces 90a or 92a therebetween. The discs 90 and 92 are held on the transverse pins 88 by nuts 95 or other suitable fastening means that engage the ends of the pins as may be seen in FIG. 2.

The first and second sets of discs 90 and 92 have first and second fluid discharge openings 96 and 98 formed therein, which openings taper outwardly in opposite directions, and are in communication with first and second transverse openings 100 and 102 formed in the first side piece 10 and second side piece 12. A first fluid discharge conduit 104 is provided that is connected to the interior of the shell 60, and a second fluid discharge conduit 106 is also provided that is in communication with the second opening 102 in the second side piece 12.

The first and second fluid discharge conduits 104 and 106 merge into a third conduit 108 at some distance from the turbine A, with the third conduit being connected to the suction side of a power-driven pump 110 that has the discharge thereof connected to a fourth conduit 114 as shown in FIG. 5. Fourth conduit 112 is connected to a valve 114, which valve has the discharge side thereof connected to a continuation of the fourth conduit 112 that extends to a fitting 116. The fitting 116 is in communication with the third bore hole E.

Fluid inlet 56 is connected to a conduit 118 that extends to a solenoid operated valve 120, which valve has a conduit 122 extending therefrom to a tee 124. The tee 124 is connected to first and second valves 126 and 128 which by conduits 126a and 168a are connected to first and second fittings 130 and 132 that are in communication with the first and second bore holes C and C-1.

The power take-off flange 80 is connected by bolts 82 to a rotatable flange 134 that forms a part of an electric generator F, that delivers electric power through conductors 136 to a transformer G. The generator F when the voltage being generated exceeds a predetermined maximum an electric current flows through conductors 138 and 140. Conductor 138 extends to ground 142 and conductor 140 to solenoid 120a of valve 120. Solenoid 120a has a conductor 144 extending therefrom to ground 142. Completion of an electric circuit to solenoid 120a results in the latter being energized to close valve 120. When the voltage being generated by generator F drops below the predetermined maximum the generator F ceases discharging an electric current to solenoid 120a, and the valve 120 by spring means (not shown) that form a part thereof return the valve to an open position to permit pressurized effluent to flow to turbine H.

Prior to discharging the pressurized effluent from the bore holes C and C-1 to the turbine A, the temperature of the effluent, the pressure and temperature thereof are determined, as well as the percentage by weight of entrained material such as droplets of water and particles of solid material.

Figure 3:
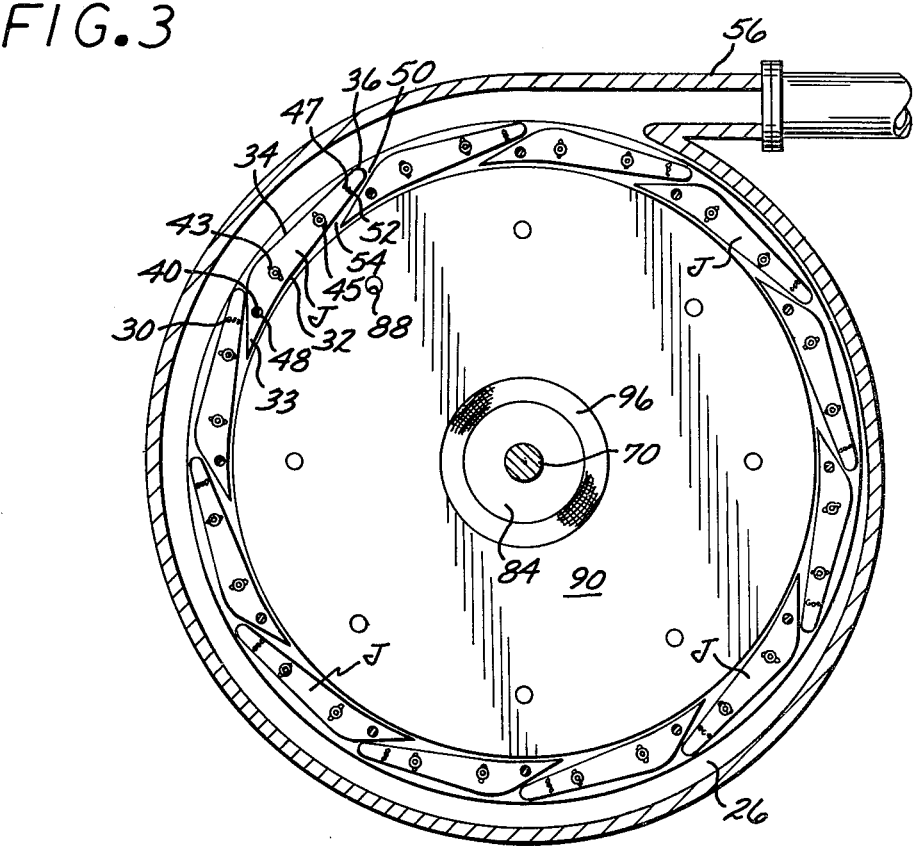
FIG. 3 is a vertical cross sectional view of the turbine taken on the line 3—3 of FIG. 2.

In FIG. 3 it will be seen that the transverse cross-section of the ring-shaped space 26 progressively decreases as it moves away from the inlet 56 in order that pressurized effluent will be delivered to each of the converging spaces 56 at substantially the same pressure. Second ring-shaped space 28 likewise progressively decreases in transverse cross section.

For each individual pressurized effluent that will be encountered from well bores C and C-1, the pressure thereof as it flows through the throats 52 will bear a definite and constant relation to the initial pressure of the effluent in the ring-shaped spaces 26 and 28, providing the back (or discharge) pressure does not exceed the throat pressure. The throat pressure which satisfies these conditions is termed the critical pressure. If the back pressure exceeds the critical pressure, the divergent space 54 serves no useful function. Therefore, to obtain discharge of the effluent onto the first and second sets of discs 90 and 92 at maximum velocity, the nozzle bodies J are pivotally adjusted relative to one another to so vary the ratio of the transverse cross-sections of the throats 52 to the diverging spaces 54 that the back pressure does not exceed the critical pressure.

The pressurized effluent as it discharges into the turbine A from inlet 56 is subdivided into two streams that flow through the first and second ring-shaped spaces 26 and 28, with the heat content of the pressurized effluent being partially converted to kinetic energy as it flows relative to the first and second sets of discs 90 and 92 prior to discharge through first and second conduits 104 and 106. To obtain maximum conversion of the heat content of the pressurized effluent to kinetic energy, the nozzle bodies J are so adjusted that the discharge of the effluent from the diverging spaces 56 is at a maximum velocity. The portion of the pressurized effluent that is in the form of vapor or steam will impart kinetic energy to the first and second sets of discs 90 and 92, but this will also be true of the entrained material such as droplets of water and solid particles.

The portion of the pressurized effluent that is in the form of steam or vapor as it flows through the first and second sets of spaces 90a and 92a loses velocity due to frictional contact with the first and second sets of discs 90 and 92. Droplets of water and solid particles entrained with the steam or vapor have kinetic energy which is transferred to the moving streams of steam and vapor as the latter slow down in moving through the spaces 90a and 92a. This transferred kinetic energy causes the streams of steam and vapor to increase in velocity and the streams at increased velocity exerting an increased drag on the first and second sets of discs 90 and 92 to power rotate the same. Thus, although the solid and liquid phase of the pressurized effluent does not physically contact the first and second sets of discs 90 and 92 due to the discs having a boundary layer of effluent thereon that protects them from abrasive contact with the liquid and solid phase, the kinetic energy of the solid and liquid phase is transferred to the first and second sets of discs 90 and 92.

The use and operation of the invention has been explained previously in detail and need not be repeated.

What is claimed is:

1. A turbine assembly that may be adjusted to produce maximum rotational power from a particular geothermal source of a multiphase fluid that includes steam and droplets of water, and may contain particles of said solid materials, said turbine assembly including:

a. a shaft that has first and second end portions and an intermediate portion therebetween;
b. a circular plate mounted on said first end portion of said shaft;
c. first and second sets of spaced discs situated on opposite sides of said plate, with the spacing between each two of said discs in a set being greater than the maximum dimension of one of said particles, said discs in each of said first and second sets having axially aligned centered openings thereon;
d. first means for supporting said first and second sets of discs from said plate in fixed positions relative thereto;
e. a housing assembly that includes first and second laterally spaced side pieces, an end piece that extends between said first and second side pieces and cooperates therewith to define a confined space in which said plate and first and second discs are disposed, and a circular rib that extends inwardly from said end piece to a position closely adjacent the periphery of said plate, said rib, first and second side pieces and said end piece cooperating to define first and second ring-shaped spaces on the outer portion of said confiend space;
f. second means for discharging said multiphase fluid concurrently into said first and second ring-shaped spaces;
g. first and second sets of elongate nozzle bodies pivotally supported in overlapping relationship from opposite sides of said rib, each pair of said nozzle bodies cooperating to define a converging space, a throat, and a diverging space therebetween, said diverging spaces in said first and second sets of nozzle bodies in communication with said first and second ring-shaped spaces and substantially tangentially disposed relative to said first and second sets of discs;
h. third adjustable means for holding each of said pairs of nozzle bodies in fixed positions relative to one another to permit said pressurized and heated fluid to discharge from said diverging sections at maximum velocity when said pairs of nozzle bodies are so adjusted that said converging spaces, throats and diverging spaces produce this result for a fluid at a particular pressure, temperature and water droplet content;
i. first and second discharge openings in said housing in communication with said openings in said first and second discs; said fluid discharging through said first and second discharge openings after traversing a spiral path through said spaces between said discs to impart kinetic energy to the latter;
j. sealing means for preventing said fluid in said confined space from escaping to said first and second openings in said housing without first flowing through said spaces between said blades;
k. bearing means disposed exteriorly of said housing for rotatably supporting said shaft; and
l. power take-off means on said shaft exteriorly of said housing.

2. A geothermal turbine assembly for use with at least one first bore hole that extends to a geothermal formation from which a heated, pressurized multiphase fluid discharges that contains both steam and droplets of water entrained therewith and a second bore hole through which said fluid may be returned to said geothermal formation, said geothermal turbine assembly including:

a. a housing that includes first and second laterally spaced side pieces and an end piece extending therebetween, said first and second side pieces and end piece defining a confined space therein; a circular rib that is centered on said end piece and extends inwardly therefrom to subdivide said confined space into first and second outwardly disposed ring-shaped spaces; an inlet in said end piece in communication with said first bore hole and said first and second ring-shaped spaces; and first and second fluid discharge openings that are centered in said first and second side pieces;
b. a hollow shell secured to said first side piece that extends over said discharge opening;
c. a base that supports said hollow shell and said housing thereabove;
d. an upright secured to said base;
e. first and second bearing assemblies that are axially aligned and centered relative to said housing, said first bearing assembly supported on the interior of said shell, and said second bearing assembly from said upright;
f. a shaft that is rotatably supported by said first and second bearing assemblies and has a cantilevered portion extending into said housing;
g. a rotor plate secured to said shaft and disposed in said housing in vertical alignment with said rib;
h. first and second sets of spaced discs secured to opposite sides of said rotor plate and vertically aligned with said first and second ring-shaped spaces, said first and second sets of discs having first and second centered openings therein;
i. a plurality of elongate nozzle bodies disposed as first and second sets in said first and second ring-shaped spaces;
j. first means for pivotally supporting said nozzle bodies to permit each of said pairs thereof to define a converging space, a throat, and a diverging space therebetween, said converging space in communication with said ring-shaped space most adjacent thereto, and said diverging space substantially tangentially disposed relative to the outer periphery of one of said discs, and each of said pairs of nozzle bodies capable of being pivotally adjusted so that the transverse cross-section of said converging and diverging spaces and said throat are so related that a jet of said fluid discharges onto one of said sets of discs at maximum velocity for the particular multiphase pressurized and heated fluid being used from said first bore hole;
k. second means for locking said nozzle bodies in positions to produce said jets of fluid at said maximum velocity, said jets entering said spaces between said discs to impart rotational motion thereto as said jets lose velocity and increase in pressure to pursue spiral paths relative to said discs and discharge through said first and second openings therein and through said first and second discharge openings in said first and second side pieces;
l. a first conduit connected to the interior of said shell, a second conduit connected to said second discharge opening in said second side piece, and said first and second conduits merging into a third conduit that intends to said second bore hole to return said fluid to said geothermal formation;
m. sealing means that separate said confined space from said first and second discharge openings in said first and second side pieces; and n. a power take-off on said shaft exteriorly of said housing and shell.

3. A geothermal turbine assembly as defined in claim 2 which in addition includes:
   o. a power driven pump interposed in said third conduit to return said fluid to said second bore hole and maintain a minimum of pressure adjacent said first and second discharge openings in said first and second side pieces.

4. A geothermal turbine assembly as defined in claim 2 which in addition includes:
   o. an electric power generator driven by said power take-off;
   p. a fourth conduit that extends from said first bore hole to said fluid inlet in said end piece;
   q. a normally open electrically operated valve in said fourth conduit that moves towards a closed position as electric power is applied thereto; and
   r. electrical conducting means that discharge electric power to said electrically operated valve when the magnitude of electric power produced by said generator rises above a predetermined magnitude.

5. A geothermal turbine assembly of the type that includes a housing that defines a confined space, a shaft rotatably supported in said housing and extending transversely through said confined space; a plurality of spaced discs supported from said shaft in said confined space, said plurality of discs having a plurality of transversely aligned center openings therein, said discs of substantially smaller diameter than that of said confined space; inlet means in an outer portion of said housing through which a pressurized and heated multiphase fluid from a geothermal source may be discharged, said fluid including steam and droplets of water; discharge means in said housing in communication with said aligned centered openings through which said multiphase fluid may flow after traversing a spiral path in said spaces to impart rotational power to said shaft due to the loss of kinetic energy to said plurality of spaced discs, said turbine assembly being characterized by:
   a. a plurality of elongate nozzle members disposed in overlapping relationship in said housing exteriorly of said discs, each pair of said members cooperating to define a converging space, a throat, and a diverging space therebetween, said converging spaces in communication with said multi-phase fluid discharged into said confined space, and said diverging spaces substantially tangentially disposed relative to the outer periphery of said discs;
   b. first means for pivotally supporting said nozzle bodies from said housing to permit the transverse cross-sections of said converging spaces, throats, and diverging sections to be varied to positions where said multiphase fluid discharges from said diverging openings at maximum velocity for a particular multiphase fluid of known pressure and temperature; and
   c. second means for removably locking said nozzle bodies in fixed positions relative to one another after said nozzle bodies have been pivoted to positions where said multiphase fluid discharges at said maximum velocity from said diverging spaces.

6. A turbine assembly as defined in claim 5 in which first and second bore holes extend to a geothermal formation, and said first bore hole being in communication with said inlet means and supplying said pressurized and heated multiphase fluid to said confined space, and said turbine assembly in addition including:
   d. a conduit connected to said discharge means and extending to said second bore hole through which said fluid flows to be returned to said geothermal formation.

7. A turbine assembly as defined in claim 6 which in addition includes:
   e. a power driven pump in said conduit intermediate said discharge means and said second bore hole for discharging said multiphase fluid to said second bore hole and for maintaining a minimum pressure in said confined space adjacent said discharge means.

8. A turbine assembly as defined in claim 6 which in addition includes:
   e. rotatable electrical generating means connected to said shaft for generating electric power as said shaft rotates.

9. A turbine assembly as defined in claim 5 which in addition includes:
   d. a plate rigidly secured to said shaft and centered in said confined space; and
   e. first means that support said plurality of discs as first and second sets of equal number on opposite sides of said plate, with both said sets in communication with said multiphase fluid discharged into said confined space through said inlet opening and said discharge means being first and second openings on opposite portions of said housing through which said multiphase fluid flows after discharging through said centered openings in said first and second sets of plates, and said shaft being subject to substantially no longitudinal thrust due to said multiphase fluid in said confined space exerting equal and opposite forces on said first and second sets of discs and said plate.

10. A turbine assembly as defined in claim 9 which in addition includes:
    f. first and second conduits that are connected to said first and second openings, and a third conduit into which said first and second conduits merge.

11. A turbine assembly as defined in claim 10 that is used in conjunction with first and second spaced bore holes that extend to a geothermal formation, said inlet opening in communication with said first bore hole and receiving said multiphase fluid therefrom, and said third conduit in communication with said second bore hole to return said multiphase fluid to said geothermal formation.

* * * * *